United States Patent
Honda

(10) Patent No.: US 12,398,515 B2
(45) Date of Patent: Aug. 26, 2025

(54) USED PAPER RECYCLING APPARATUS

(71) Applicant: SEIKO EPSON CORPORATION, Tokyo (JP)

(72) Inventor: Daisuke Honda, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 302 days.

(21) Appl. No.: 18/165,371

(22) Filed: Feb. 7, 2023

(65) Prior Publication Data
US 2023/0250585 A1    Aug. 10, 2023

(30) Foreign Application Priority Data
Feb. 9, 2022  (JP) ................. 2022-018521

(51) Int. Cl.
  *D21H 15/00*    (2006.01)
  *D21B 1/04*     (2006.01)
  *D21F 7/06*     (2006.01)

(52) U.S. Cl.
  CPC ............. *D21F 7/06* (2013.01); *D21B 1/04* (2013.01)

(58) Field of Classification Search
  CPC ................................ D21F 7/06; D21B 1/04
  See application file for complete search history.

(56) References Cited

U.S. PATENT DOCUMENTS

2017/0087910 A1*  3/2017  Nagashima .......... B41J 2/16585
2022/0219427 A1*  7/2022  Young .................... B32B 5/145

FOREIGN PATENT DOCUMENTS

JP         2017-008426 A        1/2017

* cited by examiner

*Primary Examiner* — Abbas Rashid
*Assistant Examiner* — Stephen M Russell
(74) *Attorney, Agent, or Firm* — Global IP Counselors, LLP

(57) ABSTRACT

A used paper recycling apparatus includes a defibration unit that defibrates used paper to generate a defibrated product, an accumulation unit that accumulates the defibrated product to form a web, a sheet forming unit that forms a sheet by applying at least one of heating and compression to the web, a cutting unit that cuts the sheet into a predetermined length, and an optical sensor that is provided at an exit of the sheet forming unit and that measures density information of the sheet.

5 Claims, 10 Drawing Sheets

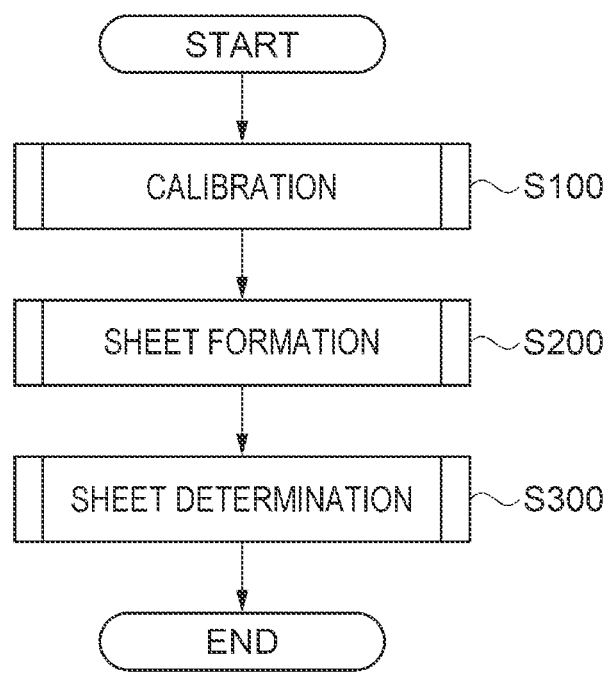

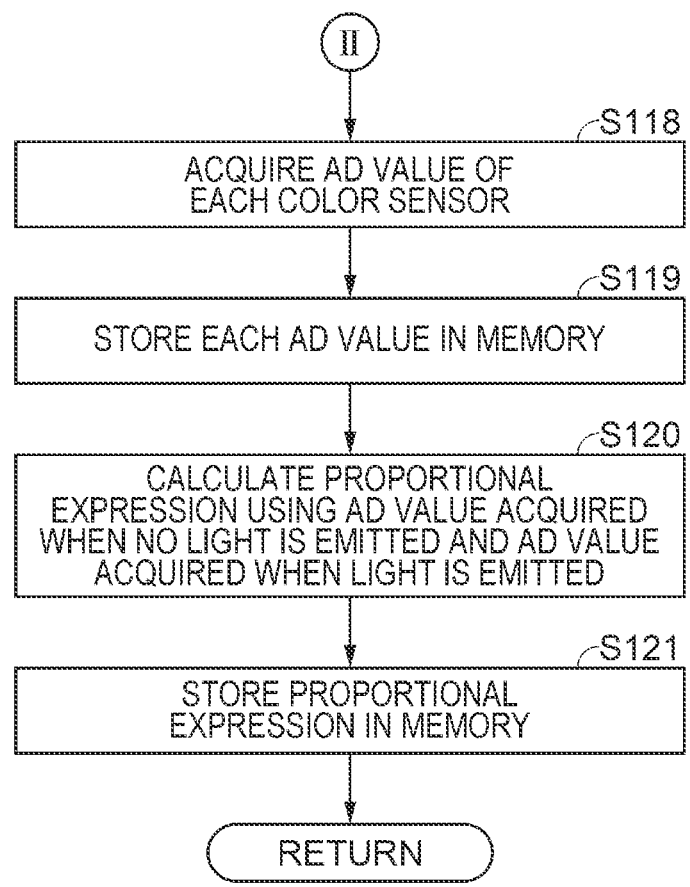

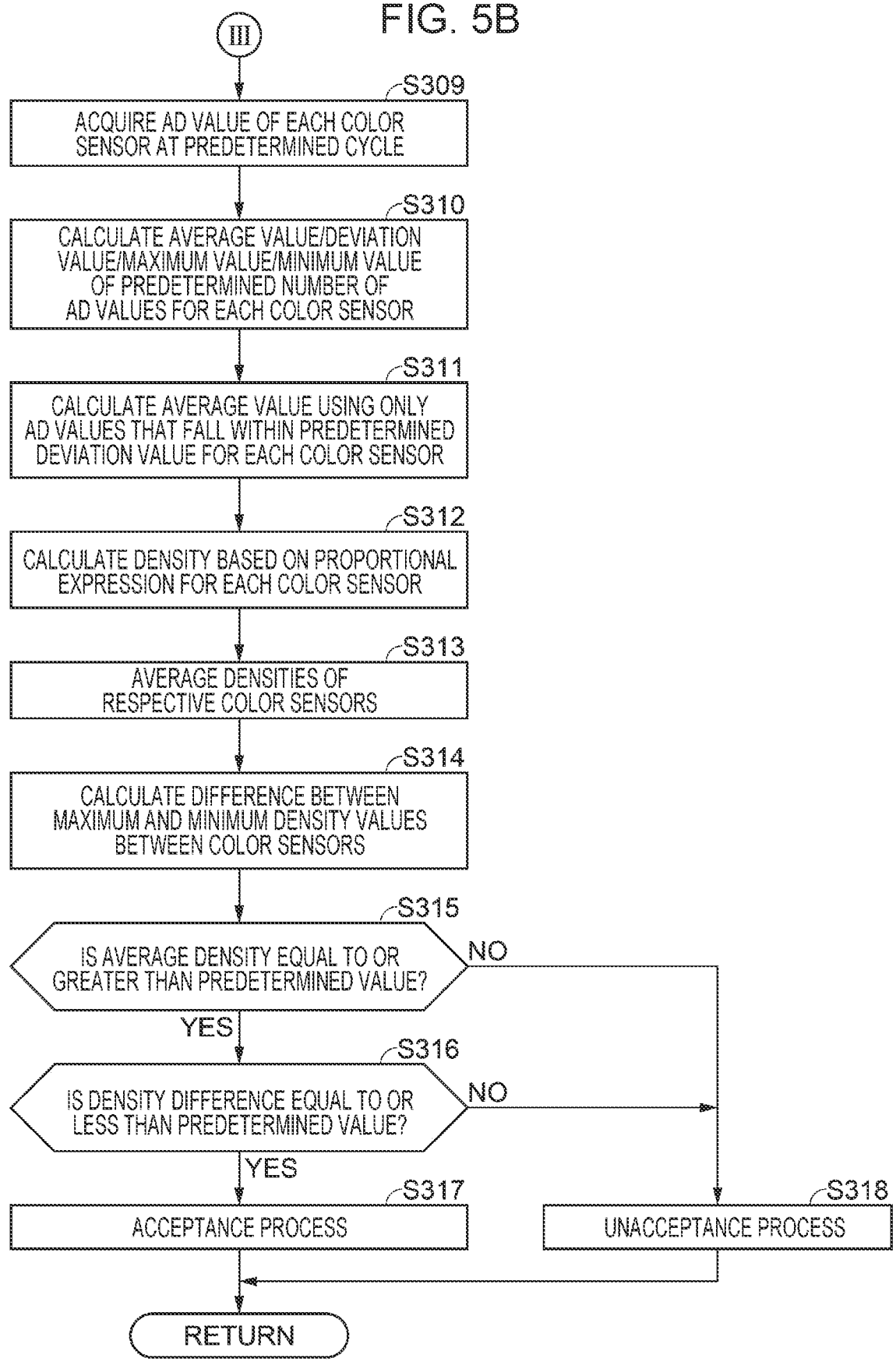

USED PAPER RECYCLING APPARATUS

The present application is based on, and claims priority from JP Application Serial Number 2022-018521, filed Feb. 9, 2022, the disclosure of which is hereby incorporated by reference herein in its entirety.

BACKGROUND

1. Technical Field

The present disclosure relates to a used paper recycling apparatus.

2. Related Art

In the related art, as disclosed in JP-A-2017-8426, there is known a used paper recycling apparatus that defibrates used paper to produce new paper.

However, in the used paper recycling apparatus described above, when the recycled paper is repeatedly recycled, the whiteness of the paper tends to gradually decrease, and the paper may be unsuitable for use. Therefore, it is necessary to determine whether the recycled paper is acceptable. However, there is a problem that the operation efficiency of the used paper recycling apparatus is lowered when the paper discrimination is performed by a human.

SUMMARY

According to an aspect of the present disclosure, a used paper recycling apparatus includes a defibration unit that defibrates used paper to generate a defibrated product, an accumulation unit that accumulates the defibrated product to form a web, a sheet forming unit that forms a sheet by applying at least one of heating and compression to the web, a cutting unit that cuts the sheet into a predetermined length, and an optical sensor that is provided at an exit of the sheet forming unit and that measures density information of the sheet.

BRIEF DESCRIPTION OF THE DRAWINGS

FIG. 3 is a flow chart showing a control method of the sheet manufacturing apparatus.

FIG. 4C is a flow chart showing a control method of the sheet manufacturing apparatus.

FIG. 5B is a flow chart showing a control method of the sheet manufacturing apparatus.

DESCRIPTION OF EXEMPLARY EMBODIMENTS

First, the configuration of a sheet manufacturing apparatus 1 as a used paper recycling apparatus will be described. The sheet manufacturing apparatus 1 dry-defibrates used paper as a raw material to fiberize the used paper, and then compresses (pressurizes), heats, and cuts the fiber to manufacture new paper (sheet S), for example. By mixing various additives into the fiberized raw material, it is possible to improve the binding strength and whiteness of the sheet S, and add functions such as color, fragrance, and flame resistance according to the application. In addition, by controlling the density, thickness, and shape of the sheet S, it is possible to manufacture the sheets S of various thicknesses and sizes, such as A4 or A3 office paper, business card paper, and the like.

Figure 1:
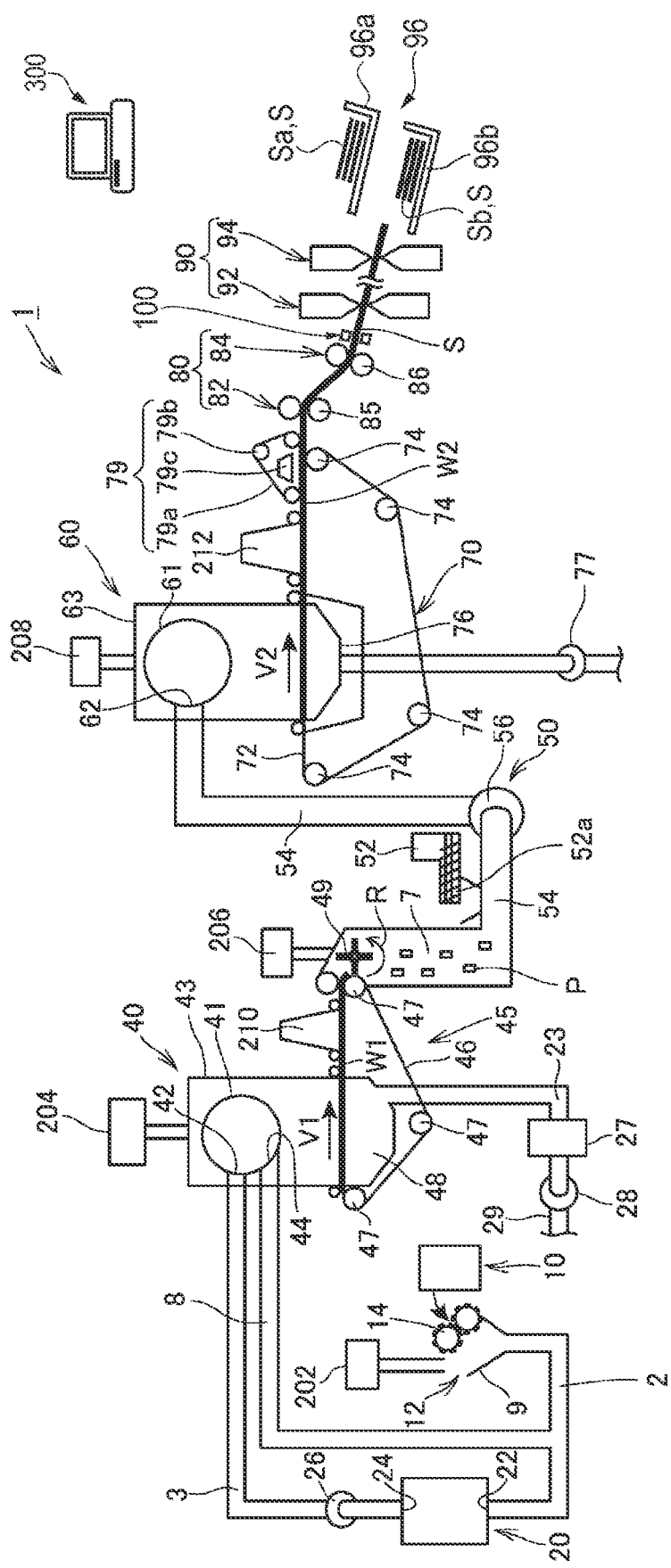
FIG. 1 is a schematic diagram showing the configuration of a sheet manufacturing apparatus.

As shown in FIG. 1, the sheet manufacturing apparatus 1 includes a supply unit 10, a coarsely crushing unit 12, a defibration unit 20, a sorting unit 40, a first web forming unit 45, a rotating body 49, and a mixing unit 50, an accumulation unit 60, a transport unit 79, a sheet forming unit 80, a cutting unit 90 and a detection unit 100.

Further, the sheet manufacturing apparatus 1 includes a controller 300 that controls the above units and the like. The controller 300 includes a CPU, a memory, a control circuit, an I/F (interface), and the like. The CPU is an arithmetic processing unit. The memory is a storage device that secures an area for storing various programs and various parameters of the CPU or a work area, and has storage elements such as a RAM and an EEPROM. The I/F is configured to be capable of transmitting and receiving information to and from an external device such as an information processing terminal. The controller 300 causes the CPU to execute arithmetic processing according to various programs and the like, and controls respective drive units and the like through the control circuit.

The sheet manufacturing apparatus 1 also includes humidifying units 202, 204, 206, 208, 210, and 212, for example, for the purpose of humidifying the raw material and humidifying the space in which the raw material moves. Humidification suppresses sticking of raw materials due to static electricity. The humidifying units 202, 204, 206, and 208 are, for example, evaporative or warm air evaporative humidifiers. The humidifying units 210 and 212 are, for example, ultrasonic humidifiers.

The supply unit 10 supplies raw materials to the coarsely crushing unit 12. The raw material supplied to the coarsely crushing unit 12 may be any material containing fibers, and examples thereof include paper, pulp, pulp sheets, non-woven fabrics, cloth, and woven fabrics. A configuration in which the sheet manufacturing apparatus 1 uses used paper as a raw material is exemplified below. The supply unit 10 includes, for example, a stacker that stacks and accumulates used paper, and an automatic input device that feeds the used paper from the stacker to the coarsely crushing unit 12.

The coarsely crushing unit 12 cuts the raw material supplied by the supply unit 10 with a coarsely crushing blade 14 into coarsely crushed pieces. The coarsely crushing blade 14 cuts the raw material in air such as the atmosphere. The coarsely crushing unit 12 includes, for example, a pair of coarsely crushing blades 14 that pinches and cuts the raw material, and a drive unit that rotates the coarsely crushing blades 14, and can have the same configuration as a so-called shredder. The shape and size of the coarsely crushed pieces are not restricted as long as they are suitable for the defibration process in the defibration unit 20. The coarsely crushing unit 12 cuts the raw material into pieces of paper having a size of, for example, one cm square to several cm square or less. The coarsely crushed pieces cut by the coarsely crushing unit 12 pass through a pipe 2 via a chute 9 and are transported to the defibration unit 20.

The defibration unit 20 defibrates the coarsely crushed material cut by the coarsely crushing unit 12. Specifically, the defibration unit 20 defibrates the raw material cut by the coarsely crushing unit 12 to generate a defibrated product. Here, "defibrate" means to disentangle a raw material in which a plurality of fibers is bound together into individual fibers. The defibration unit 20 has a function of separating substances such as resin particles, ink, toner, and anti-bleeding agent adhering to the raw material from the fibers.

The material that has passed through the defibration unit 20 is referred to as the defibrated product. The defibrated product may include, in addition to the disentangled defibrated product fibers, resin particles separated from the fibers when the fibers are disentangled, that is, resin particles for binding a plurality of fibers together, color materials such as ink, toner, and the like, additives such anti-bleeding agents and paper strength enhancers. The defibrated product that has been disentangled has a string-like or flat string-like shape. The disentangled defibrated product may be in a state in which it is not entangled with other disentangled fibers, that is, in an independent state, or may be in a state in which it is entangled with other disentangled defibrated products to form a massive form, that is, in a state of forming lumps.

The defibration unit 20 performs fibrillation in a dry manner. Here, a process such as defibration performed not in a liquid but in air such as the atmosphere is referred to as a dry process. The defibration unit 20 includes the impeller mill, for example. Specifically, the defibration unit 20 includes a rotor that rotates at high speed and a liner that is positioned at the outer periphery of the rotor. The coarsely crushed pieces cut by the coarsely crushing unit 12 are pinched between the rotor and the liner of the defibration unit 20 and defibrated. The defibration unit 20 generates an airflow by rotating the rotor. With this airflow, the defibration unit 20 can suck the coarsely crushed pieces, which are raw materials, from the pipe 2 through an introduction port 22 and transport the defibrated product to a discharge port 24. The defibrated product is sent out from the discharge port 24 to a pipe 3 and transported to the sorting unit 40 via the pipe 3. In the present embodiment, the sheet manufacturing apparatus 1 includes a defibrating blower 26 as an airflow generating device, and the defibrated product is transported to the sorting unit 40 by the airflow generated by the defibrating blower 26.

The sorting unit 40 is provided with an introduction port 42 into which the defibrated product disentangled by the defibration unit 20 flows from the pipe 3 together with the airflow. The sorting unit 40 sorts the defibrated products introduced from the introduction port 42 according to the fiber length. More specifically, the sorting unit 40 sorts the defibrated products defibrated by the defibration unit 20 into a defibrated product having a predetermined size or less as a first sorted product, and a defibrated product, as a second sorted product, larger than the first sorted product. The first sorted product includes fibers or particles, and the like, and the second sorted product includes, for example, large fibers, undefibrated pieces, coarsely crushed pieces that are not sufficiently defibrated, and lumps in which fibrillated fibers are aggregated or entangled.

The sorting unit 40 includes, for example, a drum unit 41 and a housing unit 43 that accommodates the drum unit 41.

The drum unit 41 is a cylindrical sieve that is rotationally driven by a motor. The drum unit 41 includes a mesh and functions as a sieve. According to the mesh openings, the drum unit 41 sorts the defibrated products into a first sorted product smaller than the size of the mesh opening and a second sorted product larger than the size of the mesh opening. Examples of the mesh of the drum unit 41 can include a wire mesh, an expanded metal obtained by stretching a metal plate with cuts, or a punching metal obtained by forming holes in a metal plate using a press or the like.

The defibrated product introduced from the introduction port 42 is sent into the drum unit 41 along with the airflow, and the rotation of the drum unit 41 causes the first sorted product to drop downward from the mesh openings of the drum unit 41. The second sorted product that cannot pass through the mesh openings of the drum unit 41 is flowed by the airflow flowing into the drum unit 41 from the introduction port 42, guided to the discharge port 44, and delivered to a pipe 8. The pipe 8 couples the inside of the drum unit 41 and the pipe 2. The second sorted product flowing through the pipe 8 is returned to the defibration unit 20 and defibrated.

The first sorted product sorted by the drum unit 41 passes through the mesh openings of the drum unit 41, is dispersed in the air, and descend toward a mesh belt 46 of the first web forming unit 45 located below the drum unit 41.

The first web forming unit 45 includes the mesh belt 46, rollers 47 and a suction unit 48. The mesh belt 46 is an endless belt, suspended by the three rollers 47 and rotated by the movement of the rollers 47. The surface of the mesh belt 46 is composed of a mesh with openings of a predetermined size. Among the first sorted products descending from the sorting unit 40, fine particles each having a size that can pass through the mesh opening fall below the mesh belt 46, and fibers each having a size that cannot pass through the mesh opening are accumulated on the mesh belt 46, and transported along with the mesh belt 46 in the direction of the arrow. The fine particles that fall from the mesh belt 46 includes particles that are relatively small and have low-density in the defibrated product (first sorted product), that is, resin particles that are unnecessary for binding between fibers, color materials, and additives, and are removal materials that are not used when the sheet manufacturing apparatus 1 manufactures the sheet S.

The mesh belt 46 moves at a constant speed V1 during the normal operation for manufacturing the sheet S. Here, "during the normal operation" means during operation except during execution of start control and stop control of the sheet manufacturing apparatus 1. More specifically, it refers to the time when the sheet manufacturing apparatus 1 is manufacturing the sheets S with desired quality.

The suction unit 48 sucks air from below the mesh belt 46. The suction unit 48 is coupled to a dust collecting unit 27 via a pipe 23. The dust collecting unit 27 is a filter-type or cyclone-type dust collector that separates fine particles from the airflow. A collection blower 28 is installed downstream of the dust collecting unit 27, and the collection blower 28 functions as a dust collection suction unit that sucks air from the dust collecting unit 27. Also, the air discharged by the collection blower 28 is discharged outside the sheet manufacturing apparatus 1 through a pipe 29.

In the transport path of the mesh belt 46, mist-containing air is supplied by the humidifying unit 210 downstream of the sorting unit 40. The mist, which is fine particles of water generated by the humidifying unit 210, descends toward a first web W1 to supply moisture to the first web W1. As a result, the amount of moisture contained in the first web W1 is adjusted, and adsorption of fibers to the mesh belt 46 due to static electricity can be suppressed.

The sheet manufacturing apparatus 1 includes the rotating body 49 that cuts the first web W1 accumulated on the mesh belt 46. The first web W1 is separated from the mesh belt 46 at the position where the mesh belt 46 is folded back by a roller 47 and divided by the rotating body 49.

The rotating body 49 includes a rotation blade shape that has plate-like blades and rotates. The rotating body 49 is disposed at a position where the first web W1 separated from the mesh belt 46 and the blade come into contact with each other. As the rotating body 49 rotates, for example, in the direction indicated by the arrow R in the figure, the first web W1 separated from the mesh belt 46 and transported collides with the blades and is cut into subdivided bodies P. The subdivided bodies P divided by the rotating body 49 descend inside a pipe 7 and are transported to the mixing unit 50 by the airflow flowing inside the pipe 7.

The mixing unit 50 includes an additive supply unit 52 that supplies an additive containing resin, a pipe 54 that communicates with the pipe 7 and through which an airflow containing the subdivided bodies P flows, and a mixing blower 56. The mixing unit 50 mixes the fiber composing the subdivided body P with an additive containing a resin.

In the mixing unit 50, an airflow is generated by the mixing blower 56, and the subdivided bodies P and the additives are transported while being mixed in the pipe 54. Further, the subdivided bodies P are disentangled in the course of flowing inside the pipe 7 and the pipe 54 and become finer fibers.

The additive supply unit 52 is coupled to an additive cartridge (not shown) that accumulates additives, and supplies the additive inside the additive cartridge into the pipe 54. The additive supply unit 52 stores an additive made of fine powder or fine particles inside the additive cartridge. The additive supply unit 52 includes a discharge unit 52a that delivers the stored additive to the pipe 54.

The additive supplied by the additive supply unit 52 contains resin for binding the plurality of fibers. The resin contained in the additive is a thermoplastic resin or a thermosetting resin, and examples thereof include AS resin, ABS resin, polypropylene, polyethylene, polyvinyl chloride, polystyrene, acrylic resin, polyester resin, polyethylene terephthalate, polyphenylene ether, polybutylene terephthalate, polyamide, polycarbonate, polyacetal, polyphenylene sulfide, and polyetheretherketone.

These resins may be used singly or as an appropriate mixture. That is, the additive may contain a single substance, or may be a mixture, and may contain a plurality of types of particles, each of which is composed of a single substance or a plurality of substances. Moreover, the additive may be fibrous or powdery.

The resin contained in the additive is melted by heating to bind a plurality of fibers together. Therefore, in a state in which the resin is mixed with the fibers and the resin is not heated to a temperature at which the resin melts, the fibers are not bound together.

Due to the airflow generated by the mixing blower 56, the subdivided bodies P descending through the pipe 7 and the additive supplied by the additive supply unit 52 are sucked into the pipe 54 and pass through the mixing blower 56. Due to the action of the airflow generated by the mixing blower 56 and the rotating part such as the blades of the mixing blower 56, the fibers that make up the subdivided bodies P and the additive are mixed, and this mixture, that is, the mixture of the first sorted product and the additive, is transported through the pipe 54 to the accumulation unit 60.

The accumulation unit 60 includes a second web forming unit 70, introduces the mixture of the first sorted product and the additive that has passed through the mixing unit 50 from an introduction port 62, and disentangles the entangled defibrated product (first sorted product), and causes the product to fall while dispersing it in the air. Furthermore, when the additive resin supplied from the additive supply unit 52 is fibrous, the accumulation unit 60 disentangles the entangled resin. As a result, the accumulation unit 60 can accumulate the mixture on the second web forming unit 70 with good uniformity.

The accumulation unit 60 includes a drum unit 61 and a housing unit 63 that accommodates the drum unit 61. The drum unit 61 is a cylindrical sieve that is rotationally driven by a motor. The drum unit 61 includes a mesh and functions as a sieve. Due to this mesh opening, the drum unit 61 allows fibers and particles smaller than the mesh opening to pass through the mesh and descend from the drum unit 61. The configuration of the drum unit 61 is the same as that of the drum unit 41, for example.

The second web forming unit 70 is disposed below the drum unit 61. The second web forming unit 70 accumulates the materials that has passed through the accumulation unit 60 to form a second web W2 (corresponding to a web). The second web forming unit 70 includes, for example, a mesh belt 72, rollers 74 and a suction mechanism 76.

The mesh belt 72 is an endless belt, suspended by a plurality of rollers 74 and rotated by the movement of the rollers 74. The mesh belt 72 is made of, for example, metal, resin, cloth, non-woven fabric, or the like. The surface of the mesh belt 72 is composed of a mesh with openings of a predetermined size. Among the fibers and particles falling from the drum unit 61, fine particles each having a size that can pass through the mesh opening fall below the mesh belt 72, and fibers each having a size that cannot pass through the mesh opening accumulate on the mesh belt 72, and are transported along with the mesh belt 72 in the direction of the arrow. The mesh belt 72 moves at a constant speed V2 during the normal operation of manufacturing the sheet S.

The mesh opening of the mesh belt 72 is fine and can be of a size that does not allow most of the fibers and particles falling from the drum unit 61 to pass through the mesh.

A suction mechanism 76 is provided below the mesh belt 72. The suction mechanism 76 includes a suction blower 77, and the suction force of the suction blower 77 can generate a downward airflow in the suction mechanism 76.

The suction mechanism 76 sucks the mixture dispersed in the air by the accumulation unit 60 onto the mesh belt 72. As a result, the formation of the second web W2 on the mesh belt 72 can be promoted, and the discharge speed from the accumulation unit 60 can be increased. Furthermore, the suction mechanism 76 can form a downflow in the drop path of the mixture, and can prevent the defibrated product and additives from becoming entangled during the drop.

As described above, the second web W2 that contains a large amount of air and that is soft and swollen is formed by passing through the accumulation unit 60. The second web W2 accumulated on the mesh belt 72 is transported to the sheet forming unit 80.

Air containing mist is supplied by a humidifying unit 212 downstream of the accumulation unit 60 in the transport path of the mesh belt 72. As a result, the mist generated by the humidifying unit 212 is supplied to the second web W2, and the amount of moisture contained in the second web W2 is adjusted. As a result, adsorption of fibers to the mesh belt 72 due to static electricity can be suppressed.

The sheet manufacturing apparatus 1 includes the transport unit 79 that transports the second web W2 on the mesh belt 72 to the sheet forming unit 80. The transport unit 79 includes, for example, a mesh belt 79a, rollers 79b, and a suction mechanism 79c.

The suction mechanism 79c includes a blower (not shown), and generates upward airflow for the mesh belt 79a by the suction force of the blower. This airflow sucks the second web W2, and the second web W2 separates from the mesh belt 72 and is attracted to the mesh belt 79a. The mesh belt 79a is moved by the rotation of the rollers 79b and transports the second web W2 to the sheet forming unit 80.

In this way, the transport unit 79 separates the second web W2 formed at the mesh belt 72 from the mesh belt 72 and transports the second web W2.

The sheet forming unit 80 forms the sheet S by performing at least one of heating and compression (pressurization) on the second web W2. The sheet forming unit 80 of the present embodiment forms the sheet S by pressurizing and heating the second web W2 accumulated on the mesh belt 72 and transported by the transport unit 79. The sheet forming unit 80 applies heat to the fibers and additives contained in the second web W2 to bind the plurality of fibers in the mixture to each other through the resin.

The sheet forming unit 80 includes a pressurizing unit 82 that pressurizes the second web W2 and a heating unit 84 that heats the second web W2 pressurized by the pressurizing unit 82.

The pressurizing unit 82 is composed of a pair of calender rollers 85, and pinches and pressurizes the second web W2 with a predetermined nip pressure. The thickness of the second web W2 is reduced (thinner) by being pressurized, so that the density of the second web W2 is increased. One of the pair of calender rollers 85 is a drive roller driven by a motor (not shown), and the other is a driven roller. The calender rollers 85 are rotated by the driving force of the motor, and transports the second web W2, which has been increased in density by pressurizing, to the heating unit 84.

The heating unit 84 includes, for example, a heating roller, a hot press molding machine, a hot plate, a hot air blower, an infrared heater, a flash fixing device, and the like. In the present embodiment, the heating unit 84 includes a pair of heating rollers 86. The heating rollers 86 are heated to a preset temperature by a heater installed inside or outside. The heating rollers 86 pinch the second web W2 pressurized by the calender rollers 85 and apply heat to the second web W2 to form the sheet S.

One of the pair of heating rollers 86 is a drive roller driven by a motor (not shown), and the other is a driven roller. The heating rollers 86 are rotated by the driving force of the motor and transports the heated sheet S to the cutting unit 90.

The cutting unit 90 cuts the sheet S formed by the sheet forming unit 80 into a predetermined length. The cutting unit 90 of the present embodiment includes a first cutting unit 92 that cuts the sheet S in a direction intersecting a direction in which the sheet S is transported and a second cutting unit 94 that cuts the sheet S in a direction parallel to the transporting direction. The second cutting unit 94 cuts the sheet S that has passed through the first cutting unit 92, for example. As a result, a cut sheet S of a predetermined size is formed. The cut sheet S is discharged to a discharge unit 96. The discharge unit 96 includes a first discharge unit 96a and a second discharge unit 96b on which the sheet S can be placed. The first discharge unit 96a and the second discharge unit 96b are trays or stackers.

The sheet manufacturing apparatus 1 also includes the detection unit 100 at the exit (downstream) of the sheet forming unit 80. The detection unit 100 is configured to be able to measure the density information about the sheet S. A detailed configuration of the detection unit 100 will be described later. The controller 300 determines whether the sheet S is acceptable based on the density information, about the sheet S, measured by the detection unit 100. Then, for example, a sheet Sa that is determined to be acceptable (non-defective product) is discharged to the first discharge unit 96a, and a sheet Sb that is determined to be unacceptable (defective product) is discharged to the second discharge unit 96b. By automating the determination of the sheet S, the number of man-hours for determination can be reduced, and the operational efficiency of the sheet manufacturing apparatus 1 can be improved. That is, it is possible to easily determine the sheet S while suppressing labor costs.

Figure 2A:
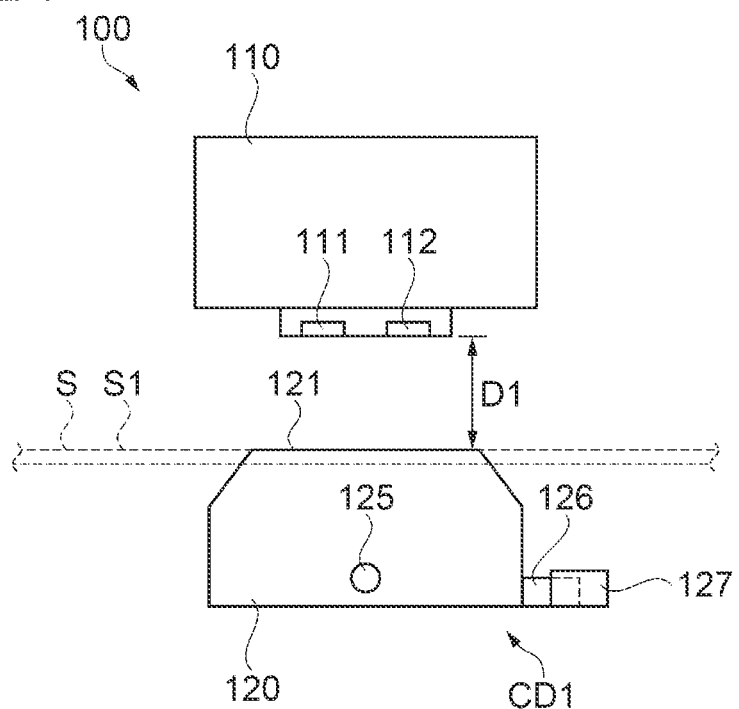
FIG. 2A is a schematic diagram showing the configuration of a detection unit.
Figure 2B:
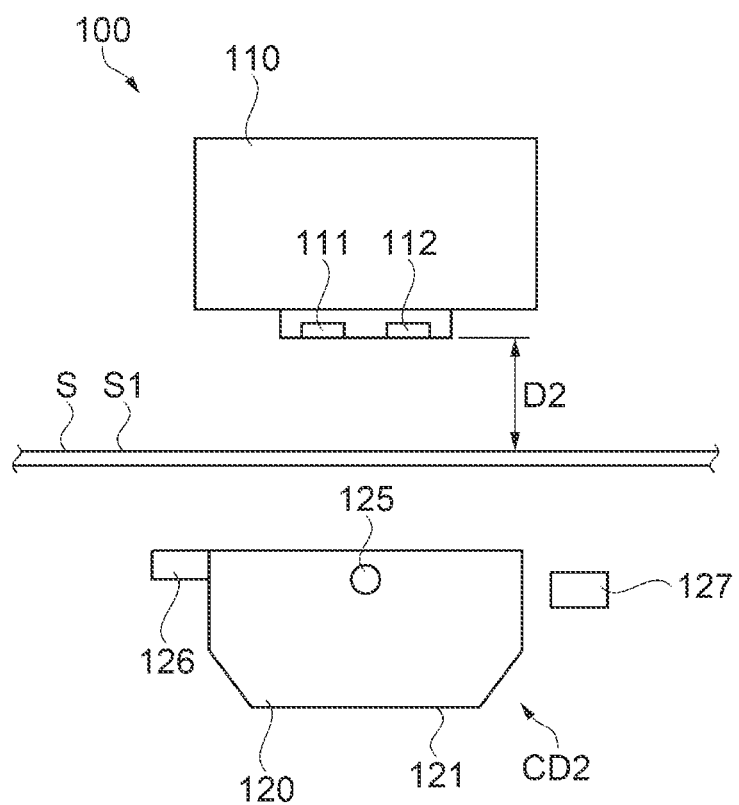
FIG. 2B is a schematic diagram showing the configuration of a detection unit.

Next, the configuration of the detection unit 100 will be described. As shown in FIGS. 2A and 2B, the detection unit 100 includes an optical sensor 110 and a reference member 120. The optical sensor 110 measures density information about the sheet S formed by the sheet forming unit 80. The density information about the sheet S includes, for example, the density of each of RGB color components of the color of the sheet S and the RGB color difference of the sheet S. The optical sensor 110 is disposed at the exit (downstream) of the sheet forming unit 80. The optical sensor 110 of the present embodiment is disposed between the sheet forming unit 80 and the cutting unit 90 in the sheet S transport path. Note that the optical sensor 110 may be disposed between the cutting unit 90 and the discharge unit 96. The optical sensor 110 can be disposed according to the layout of respective units of the sheet manufacturing apparatus 1.

The optical sensor 110 has a light emitting unit 111 capable of emitting light and an RGB sensor 112 as a light receiving unit capable of receiving light. The light emitting unit 111 is, for example, a white light emitting diode (LED) and emits light toward the sheet S. The RGB sensor 112 includes three color sensors capable of receiving respective wavelengths of red, green, and blue, and receives light reflected by the sheet S. Each color sensor of the RGB sensor 112 acquires a voltage value proportional to the amount of received light. Based on each voltage value, the density of each of RGB color components of the color of the sheet S and the RGB color difference of the sheet S can be acquired. As a result, it is possible to reliably determine whether the sheet S is acceptable based on the density (whiteness) of the sheet S and the color difference of the sheet S. Further, by individually setting the density (whiteness) and each color difference specification of the sheet S, the sheet S having the quality desired by the user can be determined.

The optical sensor 110 of the present embodiment is disposed above the transported sheet S, and the light emitting unit 111 and the RGB sensor 112 are disposed to face the upper face S1 of the sheet S. That is, since the light emitting surface of the light emitting unit 111 and the light receiving face of the RGB sensor 112 face downward, adhesion of foreign matter such as paper dust to the light emitting unit 111 and the RGB sensor 112 is suppressed, and accurate measurement can be performed.

The reference member 120 is a member used for calibration of the optical sensor 110 and the like, and is used for adjusting the sensitivity of the RGB sensor 112 in the optical sensor 110, for example. The reference member 120 is provided at a position facing the optical sensor 110. The reference member 120 of the present embodiment is disposed below the optical sensor 110, and the optical sensor 110 and the reference member 120 are disposed facing each other with the transported sheet S interposed therebetween during a time when the sheet manufacturing apparatus 1 is operating.

The reference member 120 has a reference color portion 121. The reference color portion 121 is provided on a flat face, of the reference member 120, that can face the optical sensor 110. The reference color portion 121 is a formation film on which a reference color (color/density) having a constant reflectance with respect to light emitted from the light emitting unit 111 is printed. When performing calibration of the optical sensor 110, the illuminance of the light emitting unit 111 is adjusted based on the light emitted by the light emitting unit 111 to the reference color portion 121 and a voltage value (AD value) acquired by the light received by the RGB sensor 112, so that the sensitivity of the RGB sensor 112 is adjusted. As a result, the performance of the optical sensor 110 can be maintained. In addition, individual variation of the optical sensor 110 can be suppressed. In addition, it is possible to determine whether the mounting state of the optical sensor 110 is good or bad. Note that the reference color portion 121 can appropriately set a reference color (color/density) for defining acceptance/unacceptance determination of the formed sheet S. That is, it is possible to set the reference color (color/density) to a reflectance that is a threshold value for determining acceptance/unacceptance of the sheet S. As a result, it is possible to determine the sheet S having the density (whiteness) and color difference desired by the user.

The reference member 120 is rotatably held. The reference member 120 has a rotation shaft 125. The rotation shaft 125 is rotated by the driving force of the motor, and the entire reference member 120 rotates as the rotation shaft 125 rotates. Specifically, the reference member 120 rotates between a first state CD1 (FIG. 2A) in which the reference color portion 121 faces the optical sensor 110 (light emitting unit 111, RGB sensor 112) when the optical sensor 110 is calibrated and a second state CD2 (FIG. 2B) in which the reference color portion 121 faces away from the optical sensor 110 during a time when the sheet manufacturing apparatus 1 is operating. The controller 300 drives and controls the rotation direction of the motor to displace the reference member 120 to the first state CD1 or the second state CD2.

The detection unit 100 also includes a photointerrupter 127 that determines whether the reference member 120 is in the first state CD1 or the second state CD2. The photointerrupter 127 is a sensor that includes a light emitting unit and a light receiving unit facing each other, and determines the presence or absence of an object by detecting that the object blocks the light emitted from the light emitting unit by the light receiving unit. A protrusion 126 is formed at a portion of the reference member 120. When the reference member 120 rotates and the light receiving unit detects that light from the light emitting unit of the photointerrupter 127 is blocked by the protrusion 126, it is determined that reference member 120 is in the first state CD1 (not in the second state CD2). Here, the positions of the protrusion 126 and the photointerrupter 127 are set so that the reference color portion 121 faces the optical sensor 110 when the protrusion 126 is detected by the photointerrupter 127. The photointerrupters 127 may be disposed on both sides of the reference member 120 so that the first state CD1 and the second state CD2 of the reference member 120 can be detected.

In the first state CD1, the optical sensor 110 (light emitting unit 111, RGB sensor 112) faces the reference color portion 121, so that the optical sensor 110 can be calibrated. On the other hand, in the second state CD2, since the reference color portion 121 faces downward, adhesion of foreign matter such as paper dust to the reference color portion 121 is suppressed. Further, by driving the rotation shaft 125, the reference member 120 can be easily displaced between the first state CD1 and the second state CD2. Moreover, a space for displacing the reference member 120 between the first state CD1 and the second state CD2 is not required, and an increase in the size of the sheet manufacturing apparatus 1 can be suppressed.

Further, a distance D1 between the surface of the reference color portion 121 and the optical sensor 110 when the reference color portion 121 faces the optical sensor 110 (first state CD1) is equal to a distance D2 between the sheet S transported when the reference member 120 is in the second state CD2 and the sheet manufacturing apparatus 1 is in operation and the optical sensor 110. As a result, the optical sensor 110 is calibrated under the environment same as that when measuring the density information about the formed sheet S, so the density information about the sheet S can be accurately measured.

Next, a method for controlling the sheet manufacturing apparatus 1 will be described. In the present embodiment, a control method for the detection unit 100 will be described. As shown in FIG. 3, in the sheet manufacturing apparatus 1, a calibration process of the optical sensor 110 is first executed (step S100). The controller 300 controls the optical sensor 110 and the reference member 120 to adjust the sensitivity of the optical sensor 110 (RGB sensor 112). Next, a forming process for the sheet S is executed (step S200). The controller 300 controls the supply unit 10 and the like to form the sheet S. Next, a discrimination process for the formed sheet S is executed (step S300). The controller 300 determines whether the sheets S are acceptable based on the density information about the sheets S acquired by the optical sensor 110, and sorts the sheets into the acceptable sheet Sa (non-defective product) and the unacceptable sheet Sb (defective product). Note that the calibration process may be performed while the sheet S forming process is being performed. That is, the calibration process of the optical sensor 110 may be executed before the sheet S is transported to the detection unit 100. Further, the determination process for the sheet S may be performed while the sheet S forming process is being performed. In this way, the sheet manufacturing apparatus 1 can be efficiently operated. Each process will be described below. Note that the sheet S forming process (step S200) is the same as the content when describing the configuration of the sheet manufacturing apparatus 1, so that description thereof will be omitted.

FIGS. 4A, 4B, 4C, and 4D show details of the calibration process (step S100) for the optical sensor 110. First, the controller 300 acquires an AD value of the RGB sensor 112 (each color sensor) when the light emitting unit 111 does not emit light, and determines whether the RGB sensor 112 is abnormal in the initial stage. Specifically, first, in step S101, the controller 300 sets the reference member 120 to the first state CD1. For example, when the reference member 120 is in the second state CD2, the controller 300 rotates the rotation shaft 125 so that the reference member 120 is in the first state CD1.

Next, in step S102, controller 300 determines whether the reference member 120 is in first state CD1 (FIG. 2A). Specifically, it is determined whether the photointerrupter 127 has detected the protrusion 126. When it is determined that the reference member 120 is in the first state CD1 (YES), the process proceeds to step S103. On the other hand, when it is determined that the reference member 120 is not in the first state CD1 (NO), the process proceeds to step S106.

When the process proceeds to step S106, the controller 300 determines whether the number of times that it is determined that the reference member 120 is not in the first state CD1 is a predetermined number of times. The predetermined number of times is, for example, the second time. In this case, when the number of times that it is determined that the reference member 120 is not in the first state CD1 is the first time (NO), the process proceeds to step S101. On the other hand, when the number of times that it is determined that the reference member 120 is not in the first state CD1 is the second time (YES), the process proceeds to step S107. In step S107, the abnormality process is executed. For example, when the reference member 120 cannot be set to the first state CD1, it is assumed that there is an abnormality in the photointerrupter 127, an attachment failure of the reference member 120, a motor failure, or the like.

When the process proceeds to step S103, the controller 300 drives only the RGB sensor 112 without causing the light emitting unit 111 to emit light. Then, the voltage values acquired by the RGB sensor 112 are digitally converted to acquire the AD values of respective color sensors.

Next, in step S104, the controller 300 determines whether the acquired AD value is equal to or less than a predetermined value. The predetermined value is an abnormality determination threshold value of an AD value when the light emitting unit 111 does not emit light. When the light emitting unit 111 does not emit light, the amount of light received from the reference color portion 121 is smaller than that when the light emitting unit 111 emits light, so that when the AD value of each color sensor indicates a low value (equal to or less than the abnormality determination threshold value), the controller 300 determines that the value is normal (YES), and the process proceeds to step S105 to store the AD value of each color sensor in the memory when the light emitting unit 111 does not emit light. On the other hand, when the AD value is larger than the abnormality determination threshold value (NO), the process proceeds to step S107. In step S107, the abnormality process is executed. In this case, it is presumed that the RGB sensor 112 itself is abnormal.

Next, the controller 300 acquires the AD value of the RGB sensor 112 (each color sensor) when the light emitting unit 111 emits light, and adjusts the sensitivity of the RGB sensor 112. Specifically, in step S108, the controller 300 causes the light emitting unit 111 to emit light using the initially set an initial light emission value parameter.

Next, in step S109, after the light emission amount of the light emitting unit 111 is stabilized, the controller 300 acquires the AD value of the color sensor with the highest or lowest sensitivity among the color sensors of the RGB sensor 112. In the present embodiment, the AD value of the R (red) color sensor having the highest sensitivity is acquired. By acquiring the AD value of the color sensor with the highest sensitivity or the lowest sensitivity, it is possible to efficiently adjust the illuminance of the light emitting unit 111.

Next, in step S110, the controller 300 determines whether the acquired AD value is within a predetermined value range. Specifically, it is determined whether the AD value acquired by the initial light emission value parameter is equal to or greater than the lower limit of the abnormality determination threshold value and equal to or less than the upper limit of the abnormality determination threshold value. That is, it is determined whether the color sensor in the initial state is acceptable. Then, when it is determined that the acquired AD value is within the predetermined value range (YES), the process proceeds to step S111. On the other hand, when it is determined that the acquired AD value is not within the predetermined value range (NO), the process proceeds to step S117, the optical sensor 110 is determined to be abnormal, and the abnormality process is performed.

Next, in step S111, the controller 300 calculates the ratio between the AD value acquired in step S109 (in the present embodiment, the R (red) color sensor) and the target AD value of the color sensor. As a result, the difference (ratio) between the AD value in the initial state and the target AD value is calculated.

Next, in step S112, based on the ratio calculated in step S111, the controller 300 reflects the result in the light emission value parameter of the light emitting unit 111. For example, when the ratio of the AD value in the initial state to the target AD value is 1:2, the parameter is changed to a new light emission value parameter corresponding to twice the initial light emission value parameter of the light emitting unit 111. In this example, the adjustment is made so that the amount of light emitted from the light emitting unit 111 increases (brightening). As a result, the sensitivity of the optical sensor 110 is adjusted, and the AD value of the color sensor corresponding to the target value can be acquired. Then, the light emitting unit 111 is caused to emit light using the adjusted light emission value parameter.

Next, in step S113, after the light emission amount of the light emitting unit 111 is stabilized, the controller 300 acquires the AD value of the color sensor with the highest or lowest sensitivity among the color sensors of the RGB sensor 112. In the present embodiment, the AD value of the R (red) color sensor having the highest sensitivity is acquired.

Next, in step S114, the controller 300 determines whether the acquired AD value is within the target value range. Specifically, it is determined whether the acquired AD value is within the allowable range of the target value set in step S111. When it is determined that the acquired AD value is within the range of the target value (YES), the process proceeds to step S115. In step S115, the controller 300 stores the adjusted light emission value parameter in the memory. On the other hand, when it is determined that the acquired AD value is not within the range of the target value (NO), the process proceeds to step S116. In step S116, the controller 300 determines whether the number of times that it is determined that the acquired AD value is not within the range of the target value is equal to or less than a predetermined number of times. When it is determined that the number of times is equal to or less than the predetermined number of times (YES), the process proceeds to step S111. On the other hand, when it is determined that the number of times is greater than the predetermined number of times (NO), the process proceeds to step S117, the optical sensor 110 is determined to be abnormal, and the abnormality process is executed.

Next, the controller 300 acquires the AD values of the RGB sensor 112 after sensitivity adjustment, and calculates a relational expression (proportional expression) between the density (whiteness) and the AD values. Specifically, in step S118, the controller 300 causes the light emitting unit 111 to emit light using the adjusted light emission value parameters stored in the memory, and acquires the AD value of each color sensor in the RGB sensor 112 after the light emission amount of the light emitting unit 111 is stabilized.

Next, in step S119, the controller 300 stores the acquired AD value of each color sensor in the memory.

Figure 4A:
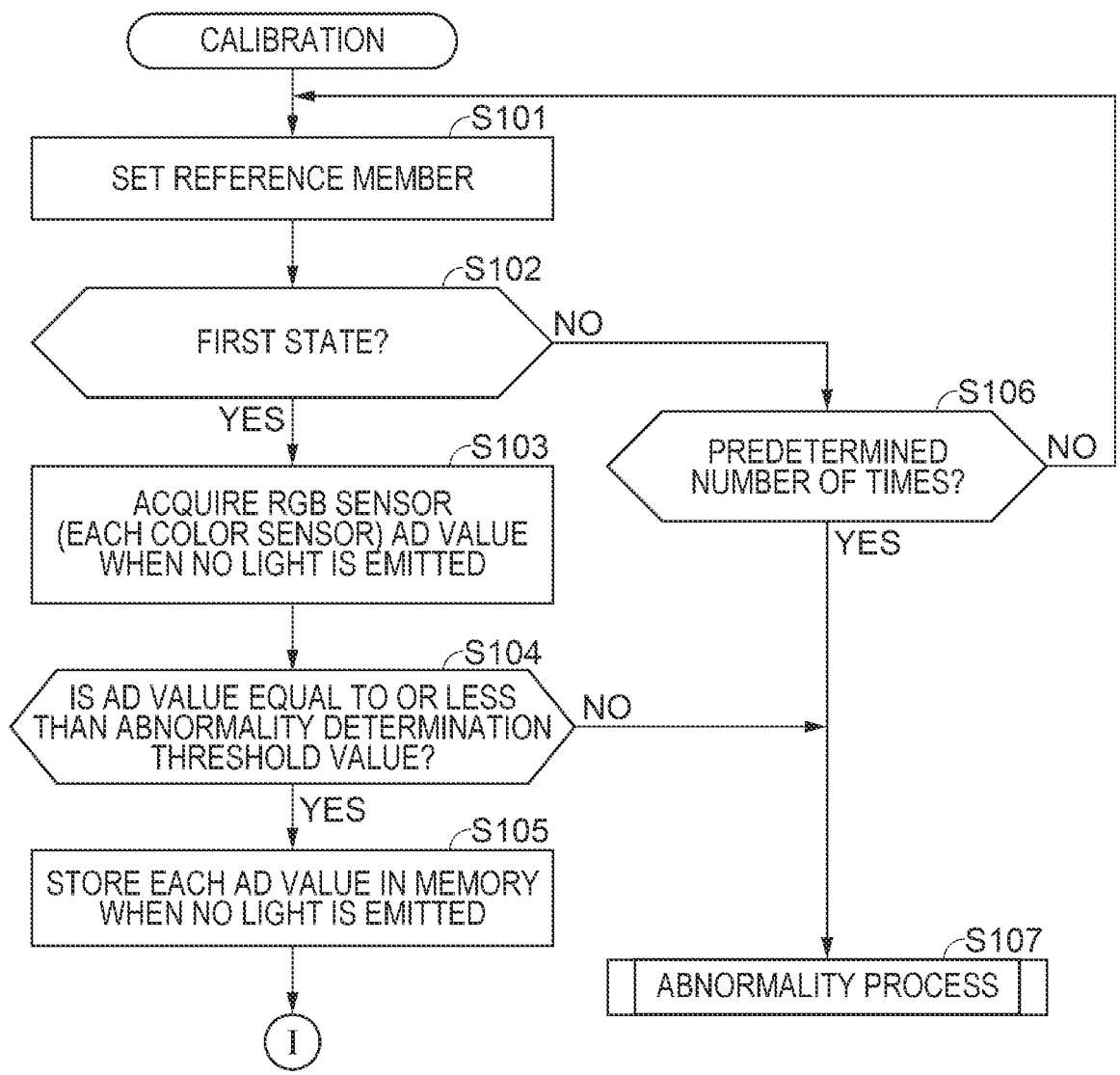
FIG. 4A is a flow chart showing a control method of the sheet manufacturing apparatus.
Figure 4B:
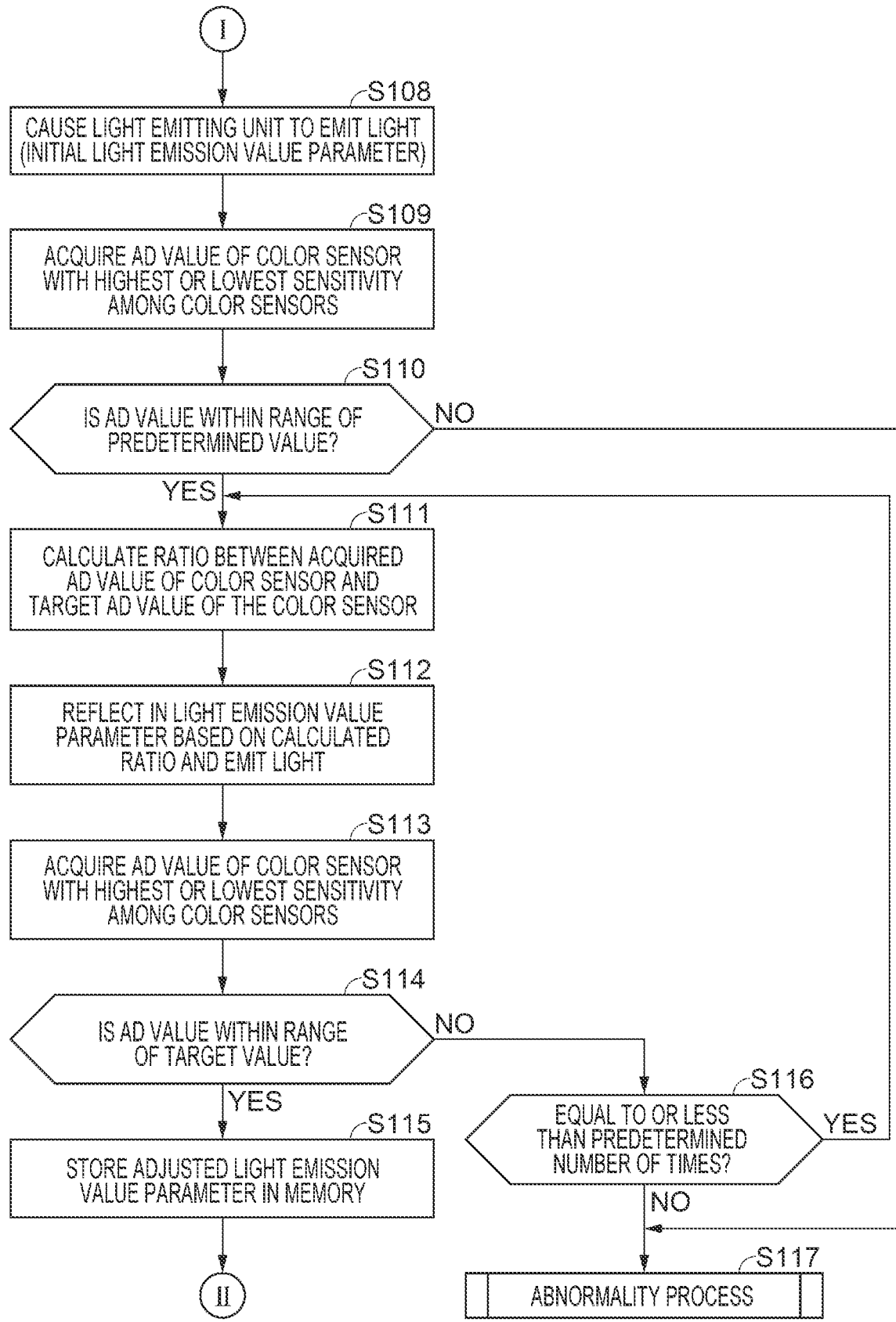
FIG. 4B is a flow chart showing a control method of the sheet manufacturing apparatus.
Figure 4D:
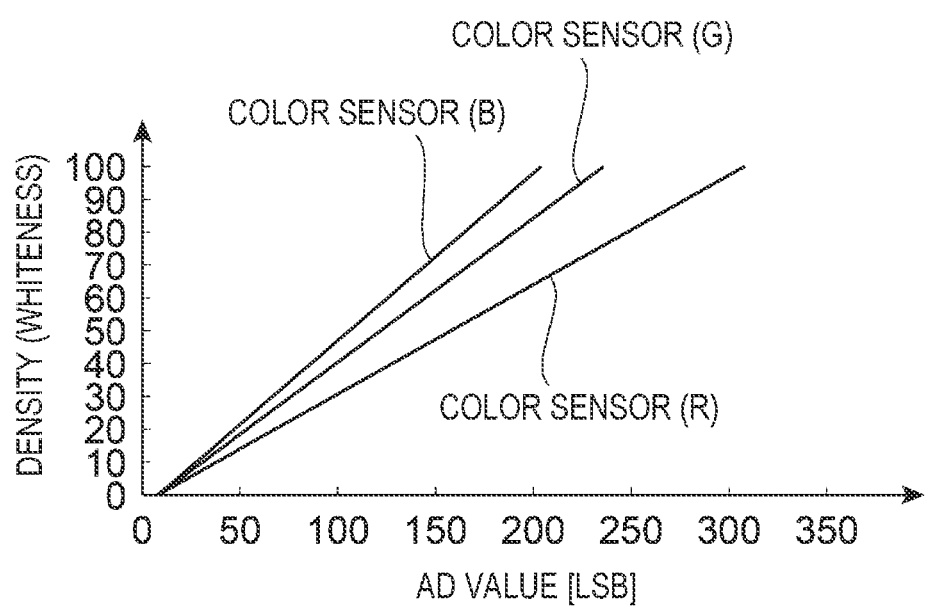
FIG. 4D is a diagram showing an example of the relationship between an AD value and whiteness.

Next, in step S120, the controller 300 calculates a proportional expression (linear expression) using an AD value of each color sensor acquired when the light emitting unit 111 is not emitting light (step S105) and an AD value of each color sensor acquired when the light emitting unit 111 is emitting light (step S115). As a result, as shown in FIG. 4D, the relational expression (proportional expression) between density (whiteness) and AD value is calculated for each color sensor.

Next, in step S121, the controller 300 stores the calculated proportional expression of each color sensor in the RGB sensor 112 in the memory. With the above, the calibration process of the optical sensor 110 is completed.

Figure 5A:
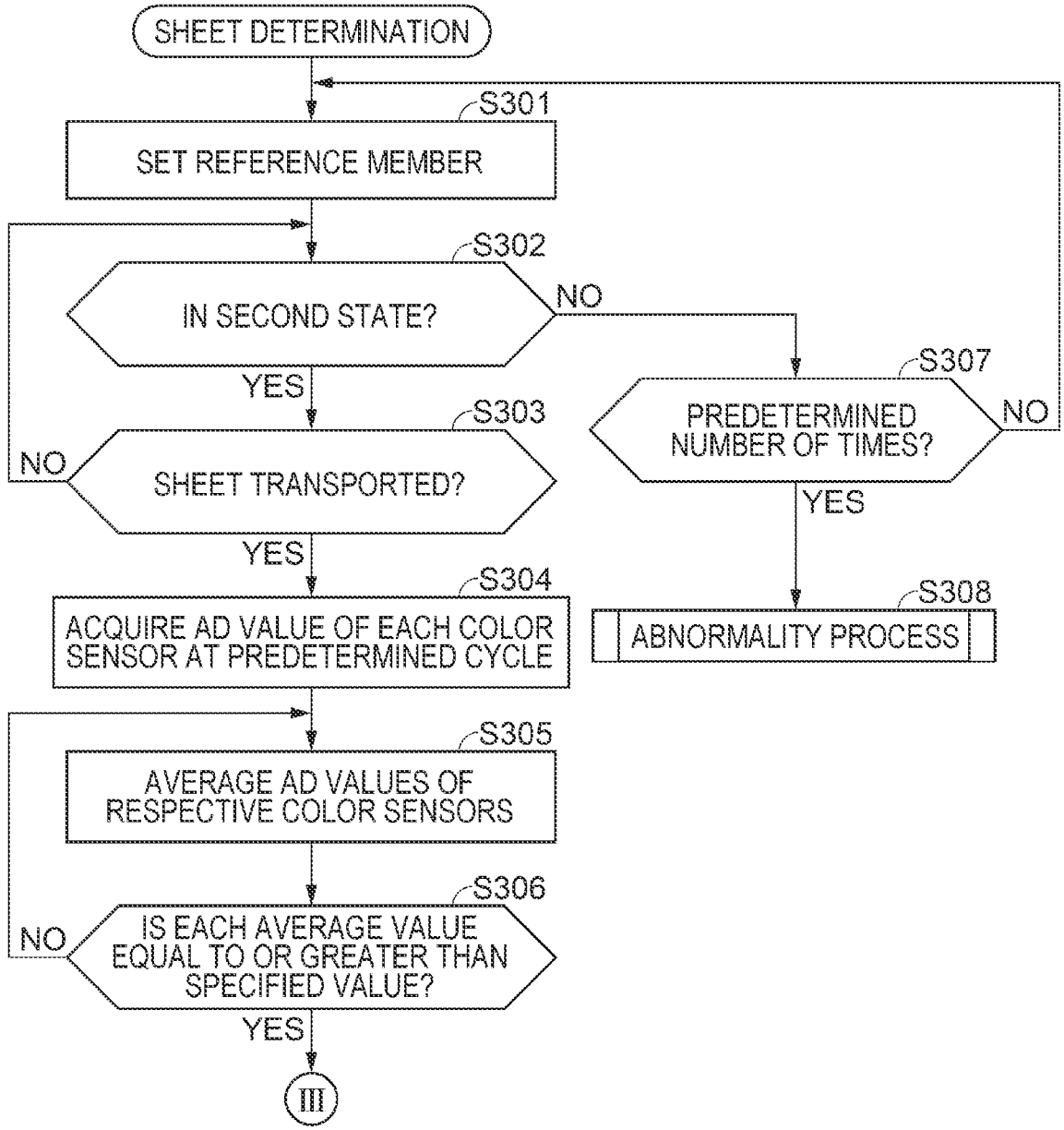
FIG. 5A is a flow chart showing a control method of the sheet manufacturing apparatus.
Figure 5C:
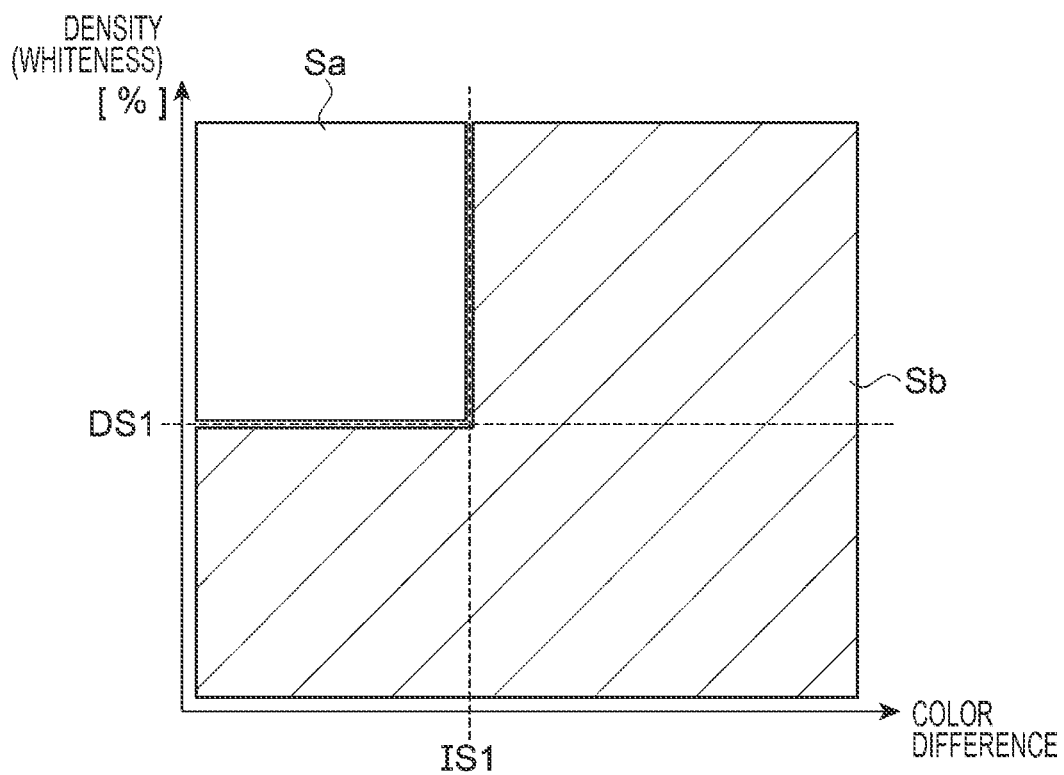
FIG. 5C is a diagram showing an example of sheet discrimination.

Next, the determination process for the sheet S (step S300) will be described. FIGS. 5A, 5B, and 5C show the details of the sheet S determination process. First, the controller 300 executes the process of forming the sheet S, and determines whether the formed sheet S has reached the measurable area of the optical sensor 110. Specifically, in step S301, the controller 300 sets the reference member 120 to the second state CD2. For example, when the reference member 120 is in the first state CD1, the rotation shaft 125 is rotated so that the reference member 120 is in the second state CD2.

Next, in step S302, controller 300 determines whether the reference member 120 is in second state CD2 (FIG. 2B). Specifically, it is determined whether the protrusion 126 of the photointerrupter 127 is detected. When it is determined that the reference member 120 is in the second state CD2 (YES), the process proceeds to step S303. On the other hand, when it is determined that the reference member 120 is not in the second state CD2 (NO), the process proceeds to step S307.

When the process proceeds to step S307, the controller 300 determines whether the number of times that it is determined that the reference member 120 is not in the second state CD2 is a predetermined number of times. The predetermined number of times is, for example, the second time. In this case, when the number of times that it is determined that the reference member 120 is not in the second state CD2 is the first time (NO), the process proceeds to step S301. On the other hand, when the number of times that it is determined that the reference member 120 is not in the second state CD2 is the second time (YES), the process proceeds to step S308. In step S308, the abnormality process is executed. For example, when the reference member 120 cannot be set to the second state CD2, it is assumed that there is an abnormality in the photointerrupter 127, an attachment failure of the reference member 120, a motor failure, or the like.

In step S303, the controller 300 determines whether the formed sheet S has been transported in the measurable area of the optical sensor 110. For example, the light emitting unit 111 of the optical sensor 110 emits light, and the RGB sensor 112 receives the reflected light. Since the amount of received light changes depending on whether there is reflection from the sheet S, it is possible to detect whether the sheet S has been transported. When it is determined that the sheet S has been transported (YES), the process proceeds to step S304. On the other hand, when it is determined that the sheet S is not transported (NO), the process proceeds to step S302.

Next, in step S304, the controller 300 acquires AD values of the RGB sensor 112 at a predetermined cycle (for example, one msec). Specifically, the AD value of each color sensor is acquired. Note that the predetermined cycle can be appropriately set according to the sheet S transporting speed.

Next, in step S305, the controller 300 averages the acquired AD values of each color sensors. Specifically, the average value of the predetermined number of AD values sequentially acquired of each color sensor is calculated.

Next, in step S306, the controller 300 determines whether the average AD value of each color sensor calculated in step S305 is equal to or greater than a specified value. The specified value is a threshold value for determining the presence or absence of the sheet S in the measurable area of the optical sensor 110. When it is determined that the average AD value of each color sensor is equal to or greater than the specified value (YES), that is, when the sheet S reaches the measurable area of the optical sensor 110, the process proceeds to step S309. On the other hand, when it is determined that the average AD value of each color sensor is less than the specified value (NO), the process proceeds to step S305.

After step S309, the controller 300 calculates the RGB density of the sheet S and the RGB color difference of the sheet S based on the AD values acquired from the optical sensor 110, and determines whether the sheet S is acceptable based on the calculation result. Specifically, in step S309, the controller 300 acquires AD values of the RGB sensor 112 at the predetermined cycle (for example, one msec). Specifically, a plurality of AD values of each color sensor is acquired. Note that when the sheet S reaches the measurable area of the optical sensor 110, the thickness dimension of the leading end portion of the sheet S tends to vary. Therefore, acquisition of AD values by the RGB sensor 112 is started after a predetermined time has elapsed. As a result, the AD values can be acquired accurately.

Next, in step S310, the controller 300 calculates an average value, a deviation value, a maximum value, and a minimum value for each color sensor using a predetermined number of AD values sequentially acquired as the sheet S is transported.

Next, in step S311, the controller 300 calculates an average value using only AD values within a predetermined deviation value for each color sensor. As a result, for example, by excluding AD values obtained by measuring peculiar portions such as black or white lumps formed at the sheet S, variations in calculation results can be reduced.

Next, in step S312, the controller 300 calculates the density (whiteness) of each color sensor based on the proportional expression (FIG. 4D) using the average value calculated in step S311. Specifically, the density corresponding to the AD value of the R color sensor, the density corresponding to the AD value of the G color sensor, and the density corresponding to the AD value of the B color sensor are calculated.

Next, in step S313, the controller 300 averages the densities of respective color sensors calculated from the proportional expression in step S312. Specifically, the sum of the density of the R color sensor, the density of the G color sensor, and the density of the B color sensor is divided by three. As a result, the RGB density (whiteness) of the color of the sheet S is calculated.

Next, in step S314, the controller 300 calculates the difference (difference in density) between the maximum value and the minimum value of the density calculation values between the color sensors calculated from the proportional expression in step S312. For example, the difference between the density (maximum value) calculated from the AD value of the R color sensor and the density (minimum value) calculated from the AD value of the B color sensor is calculated. From this, the RGB color difference of the sheet S is calculated.

Next, in step S315, the controller 300 determines whether the average density calculated in step S313 is equal to or greater than a predetermined value. The predetermined value in this step is a density determination threshold value DS1 (FIG. 5C) of the sheet S desired by the user. Then, when it is determined that the average density is equal to or higher than the predetermined value (YES), the process proceeds to step S316. On the other hand, when it is determined that the average concentration is less than the predetermined value (NO), the process proceeds to step S318.

When the process proceeds to step S318, the sheet S for which the average density is determined to be less than the predetermined value is determined to be unacceptable (defective product), and the unacceptable sheet Sb is discharged to the second discharge unit 96b.

When the process proceeds to step S316, the controller 300 determines whether the difference in density calculated in step S314 is equal to or less than a predetermined value. The predetermined value in this step is an RGB color difference determination threshold value IS1 of the sheet S (FIG. 5C). When it is determined that the difference in density is equal to or less than the predetermined value (YES), the process proceeds to step S317. On the other hand, when it is determined that the difference in density is greater than the predetermined value (NO), the process proceeds to step S318. When the process proceeds to step S318, the sheet S for which the difference in density is determined to be greater than the predetermined value is determined to be unacceptable (defective product), and the unacceptable sheet Sb is discharged to the second discharge unit 96b.

When the process proceeds to step S317, the sheet S for which the difference in density is determined to be equal to or less than a predetermined value is determined to be acceptable (non-defective product), and the acceptable sheet Sa is discharged to the first discharge unit 96a. That is, as shown in FIG. 5C, the acceptable sheet Sa has a density (whiteness) equal to or greater than the density determination threshold value DS1 and a color difference equal to or less than the determination threshold value IS1. On the other hand, the unacceptable sheet Sb has a density (whiteness) less than the density determination threshold value DS1 or a color difference greater than the determination threshold value IS1.

According to the present embodiment, it is possible to easily determine the sheet S (sheet Sa or sheet Sb) based on the density information (whiteness/color difference) about the formed sheet S. Further, when the recycled sheet S is repeatedly recycled, the density of the sheet S decreases, the lengths of the fibers composing the sheet S decreases, the adhesive force between the fibers decreases, and the strength of the sheet S decreases. According to the present embodiment, by determining the sheet S based on the density information about the sheet S, it is also possible to determine whether the sheet S satisfies a predetermined strength. By individually setting threshold values of the density (whiteness) and the color difference that define the determination of the sheet S, it is possible to easily determine the sheet S having the quality desired by the user.

What is claimed is:

1. A used paper recycling apparatus comprising:
    a defibration unit that defibrates used paper to generate a defibrated product;
    an accumulation unit that accumulates the defibrated product to form a web;
    a sheet forming unit that forms a sheet by applying at least one of heating and compression to the web;
    a cutting unit that cuts the sheet into a predetermined length; and
    an optical sensor provided at an exit of the sheet forming unit and including three color sensors that receive wavelengths of red, green, and blue, respectively, the optical sensor measuring density information about the sheet, the density information including a density of each of RGB color components of a color of the sheet and an RGB color difference of the sheet, the RGB color difference being a difference between a maximum value and a minimum value among density calculation values that correspond to average voltage values for the three color sensors, respectively, the average voltage values being average values of voltage values obtained for a predetermined cycle at the three color sensors, respectively.

2. The used paper recycling apparatus according to claim 1, wherein
    the optical sensor is disposed between the sheet forming unit and the cutting unit.

3. The used paper recycling apparatus according to claim 1, further comprising:
    a reference member provided at a position facing the optical sensor, wherein
    the used paper recycling apparatus calibrates the optical sensor based on a result of measuring a reference color portion provided on the reference member.

4. The used paper recycling apparatus according to claim 3, wherein
    the reference member is rotatably held, and the reference member rotates so that the reference color portion faces the optical sensor when the calibration is performed, and the reference color portion faces away from the optical sensor during a time when the used paper recycling apparatus is operating.

5. The used paper recycling apparatus according to claim 4, wherein
    a distance between a surface of the reference color portion and the optical sensor when the reference color portion faces the optical sensor is equal to a distance between the sheet and the optical sensor when the used paper recycling apparatus is in operation.

* * * * *